US008264709B2

(12) United States Patent
Okajima et al.

(10) Patent No.: US 8,264,709 B2
(45) Date of Patent: Sep. 11, 2012

(54) LOCK PRINTING BASED ON DISTANCE FROM CLIENT TO PRINTER

(75) Inventors: Takaharu Okajima, Montville, NJ (US); Kazuhiko Kato, Woodcliff Lake, NJ (US)

(73) Assignees: Ricoh Company, Ltd., Tokyo (JP); Ricoh Americas Corporation, Cupertino, CA (US)

( * ) Notice: Subject to any disclaimer, the term of this patent is extended or adjusted under 35 U.S.C. 154(b) by 756 days.

(21) Appl. No.: 12/412,777

(22) Filed: Mar. 27, 2009

(65) Prior Publication Data

US 2010/0245886 A1 Sep. 30, 2010

(51) Int. Cl.
*G06K 15/00* (2006.01)
*G06F 3/12* (2006.01)

(52) U.S. Cl. ..................... 358/1.14; 358/1.15
(58) Field of Classification Search ................. 358/1.14, 358/1.15
See application file for complete search history.

(56) References Cited

U.S. PATENT DOCUMENTS

| 6,438,574 | B1 | 8/2002 | Nagashima | |
|---|---|---|---|---|
| 7,249,900 | B1 | 7/2007 | Katano et al. | |
| 7,965,401 | B2* | 6/2011 | Ishimaru | 358/1.14 |
| 2004/0075860 | A1* | 4/2004 | Shima et al. | 358/1.15 |
| 2004/0114503 | A1* | 6/2004 | Schneider et al. | 370/201 |
| 2004/0125163 | A1* | 7/2004 | Shima et al. | 347/16 |

OTHER PUBLICATIONS

GeoFi—"A system for Indoor Location Using WiFi Access Point Labeling", California Research Center, Ricoh Innovations Inc., Ricoh Technical Report No. 34, Dec. 2008; K. Piersol et al.
Wi-Fi, Wikipedia: The Free Encyclopedia, Mar. 20, 2009.
"Indoor and Outdoor Positioning in Mobile Environments—a Review and some Investigations on WLAN—Positioning", Geographic Information Sciences, 10:2, pp. 91-98 (2004); R. Bill et al.
"Indoor Positioning and Navigation Using WLAN Technology", Proceedings of the $6^{th}$ conference "New Technology: Development and Application Perspectives", Taganrog State Radiotechnical University, Taganrog, Russia, pp. 10-23 (2003), E. Gryazin et al.
"Indoor Positioning with a WLAN Access Point List on a Mobile Device", WSW '06, SenSys '06, Boulder, CO, USA, Oct. 31, 2006; M. Hermersdorf.

* cited by examiner

*Primary Examiner* — Benny Q Tieu
*Assistant Examiner* — Eric A Rust
(74) *Attorney, Agent, or Firm* — Oblon, Spivak, McClelland, Maier & Neustadt, L.L.P.

(57) ABSTRACT

A method, apparatus, system, and computer-readable storage medium for setting a print mode of a printing device. The method includes receiving, from a client device, a request to print a print job at the printing device, and determining a distance between the client device and the printing device. A print mode is corresponding to the print job is set to one of a locked print mode or an unlocked print mode based on the determined distance between the client device and the printing device. The method further includes sending the print job and the corresponding print mode setting to the printing device.

17 Claims, 15 Drawing Sheets

DISTANCE TABLE 68

| | User000 | User001 | User002 | User003 | User004 | User005 | User006 |
|---|---|---|---|---|---|---|---|
| Device000 | 1 | 1 | 1 | 1 | 1 | 1 | 0 |
| Device001 | 1 | 1 | 1 | 1 | 1 | 1 | 1 |
| Device002 | 1 | 1 | 1 | 1 | 1 | 1 | 1 |

Figure 13

PRINT LOG 600

| USER | USER ID | PIN CODE | SELECTED OUTPUT DEVICE | DISTANCE | STATUS 1 | STATUS 2 |
|---|---|---|---|---|---|---|
| User004 | MAC.ST | ****1234 | Dvice001_111.16.34.11 | 1 | LK | Printed |
| User001 | JIM.DC | ****5383 | Dvice002_111.16.34.12 | 1 | LK | Ready |
| User001 | JIM.DC | ****5383 | Dvice001_111.16.34.11 | 1 | LK | Ready |
| User002 | RIC.CH | ****4456 | Dvice001_111.16.34.11 | 1 | LK | Ready |
| User006 | KAZ.KK | ****4111 | Dvice000_111.16.34.00 | 0 | UN | Printed |
| User004 | MAC.ST | ****1234 | Dvice001_111.16.34.11 | 1 | LK | Printed |
| . | . | . | . | . | . | . |
| . | . | . | . | . | . | . |
| . | . | . | . | . | . | . |

Figure 14

LOCK PRINTING BASED ON DISTANCE FROM CLIENT TO PRINTER

BACKGROUND OF THE INVENTION

1. Field of the Invention

The present invention relates generally to an improved printing management method and data processing method. The present invention is more particularly related to determining whether a print job should be printed using a locked print mode or an unlocked print mode based on a distance between a client device and a printing device.

2. Description of the Related Art

In environments such as an office or computer lab, computers may be connected to one or more printers shared over a network. To print a document, a computer user typically transmits a request to print the document to one of the shared printers. The shared printer prints the document, in response to the print request, and the computer user retrieves the printed document from the shared printer.

However, in such environments, it is difficult to maintain confidentiality of the printed document. For example, it is difficult to prevent other users from viewing the printed document between the time the document is printed by the printer and when the printed document is retrieved by the computer user. Accordingly, some printing devices are configured with a feature known as "locked printing," to provide control over the printing of electronic documents.

When a printing device is configured with the locked printing feature and print data is sent to the printing device, a printed version of an electronic document reflected in the print data is not generated until a password or ID card is successfully verified at the printing device. Typically, a user enters the password which, when successfully verified, allows a printed version of the electronic document reflected in the print data to be generated.

However, in the conventional locked printing approach, an administrator sets up the locked printing feature by manually configuring the printing device through an operation panel of the printing device. Therefore, the operation of the locked printing function is typically set for all printing operations, regardless of the actual usage patterns of users.

Further, FIG. 1 illustrates an example of a print job operation routine, as disclosed in U.S. Pat. No. 6,438,574, which is incorporated by reference in its entirety. As illustrated in FIG. 1, it is determined at step S4 whether it is necessary to attach a password to a print job. That is, there are instances where it is necessary to maintain the secrecy of job data printed in a case where a document or the like is created using application software such as a word processor or spreadsheet. If such secrecy is unnecessary, entry of a password is not required. If secrecy is necessary, on the other hand, a decision is rendered to the effect that entry of the password is required. If the answer at step S4 is "NO," control proceeds to step S6. If the answer at step S4 is "YES," on the other hand, a keyboard of a computer is operated to enter the password, in step S5, and control proceeds to step S6, at which time printer driver software for generating a PDL is started and printing is performed.

FIG. 2 illustrates an approach for implementing locked printing on a printing device, as disclosed in U.S. Pat. No. 7,249,900, which is incorporated by reference in its entirety. As illustrated in FIG. 2, locked printing is initiated by a user at a client device in step S10. The user specifies a user ID and password data corresponding to the locked printing. Next, print data is generated and transmitted to the printing device in steps S11 and S12, respectively. In the printing device, the print data is processed by a locked print process in step S13, and stored on the printing device if locked printing is specified in step S14. Then, the user accesses the printing device and selects the locked printing option in step S15. The user selects the user ID and enters the corresponding password data in step S16. When the password data is authenticated in step S17, a list of print data associated with the authenticated user ID/password pair is presented in step S18. The user may select one or more of the listed print data and perform an action (e.g., print or delete) in step S19.

The print job operation routine of U.S. Pat. No. 6,438,574 attaches the password to the print job based on the application software used to create the document to be printed. U.S. Pat. No. 7,249,900 discusses that the user specifies whether locked or unlocked printing should be used for each request to print the print job at the printing device. However, in either example, the user cannot conveniently switch between locked and unlocked printing and maintain the confidentiality of the printed documents. For example, in the event that the user prints a document created by application software that is not identified as requiring a password, or forgets to specify locked printing when requesting that the print job be printed, confidentiality of the printed document cannot be maintained if the user cannot retrieve the printed document in a timely manner.

SUMMARY OF THE INVENTION

Accordingly, an object of the present invention is to provide a print system having the flexibility of the locked printing function.

Another object of the present invention is to provide a print system having a locked printing function implemented by a positioning function. In an exemplary embodiment of the print system, improvement of the locked printing function is accomplished by using a Wireless Local Area Network (WLAN, also called WiFi), or GeoFi technology developed by Ricoh Innovations, Inc.

According to an embodiment of the present invention, a method is provided for setting a print mode of a printing device. The method includes receiving, from a client device, a request to print a print job at the printing device, and determining a distance between the client device and the printing device. A print mode is corresponding to the print job is set to one of a locked print mode or an unlocked print mode based on the determined distance between the client device and the printing device. The method further includes sending the print job and the corresponding print mode setting to the printing device.

According to another embodiment of the invention, there is provided a server device. The server device includes means for receiving, from a client device, a request to print a print job at a printing device; means for determining a distance between the client device and the printing device; means for setting a print mode corresponding to the print job to one of a locked print mode or an unlocked print mode based on the determined distance between the client device and the printing device; and means for sending the print job and the corresponding print mode setting to the printing device.

According to another embodiment of the invention, there is a provided a system for setting a print mode of a printing device. The system includes a client device, a server device, and the printing device. The client device is configured to send, to the server device, a request to print a print job at the printing device. The server device includes means for receiving, from the client device, the request to print the print job at the printing device, means for determining a distance between the client device and the printing device, means for setting a print mode corresponding to the print job to one of a locked print mode or an unlocked print mode based on the determined distance between the client device and the printing device, and means for sending the print job and the corresponding print mode setting to the printing device. Further, the printing device is configured to print the print job in accordance with the corresponding print mode setting.

Further, according to another embodiment of the present invention, there is provided a computer-readable storage medium having instructions embedded therein, which when executed by a processor, cause the processor to perform the method discussed above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 illustrates an embodiment of a Distance Table used by the printing system.

FIG. 14 illustrates an exemplary print log for display by the server.

DETAILED DESCRIPTION OF THE PREFERRED EMBODIMENTS

Figure 1:
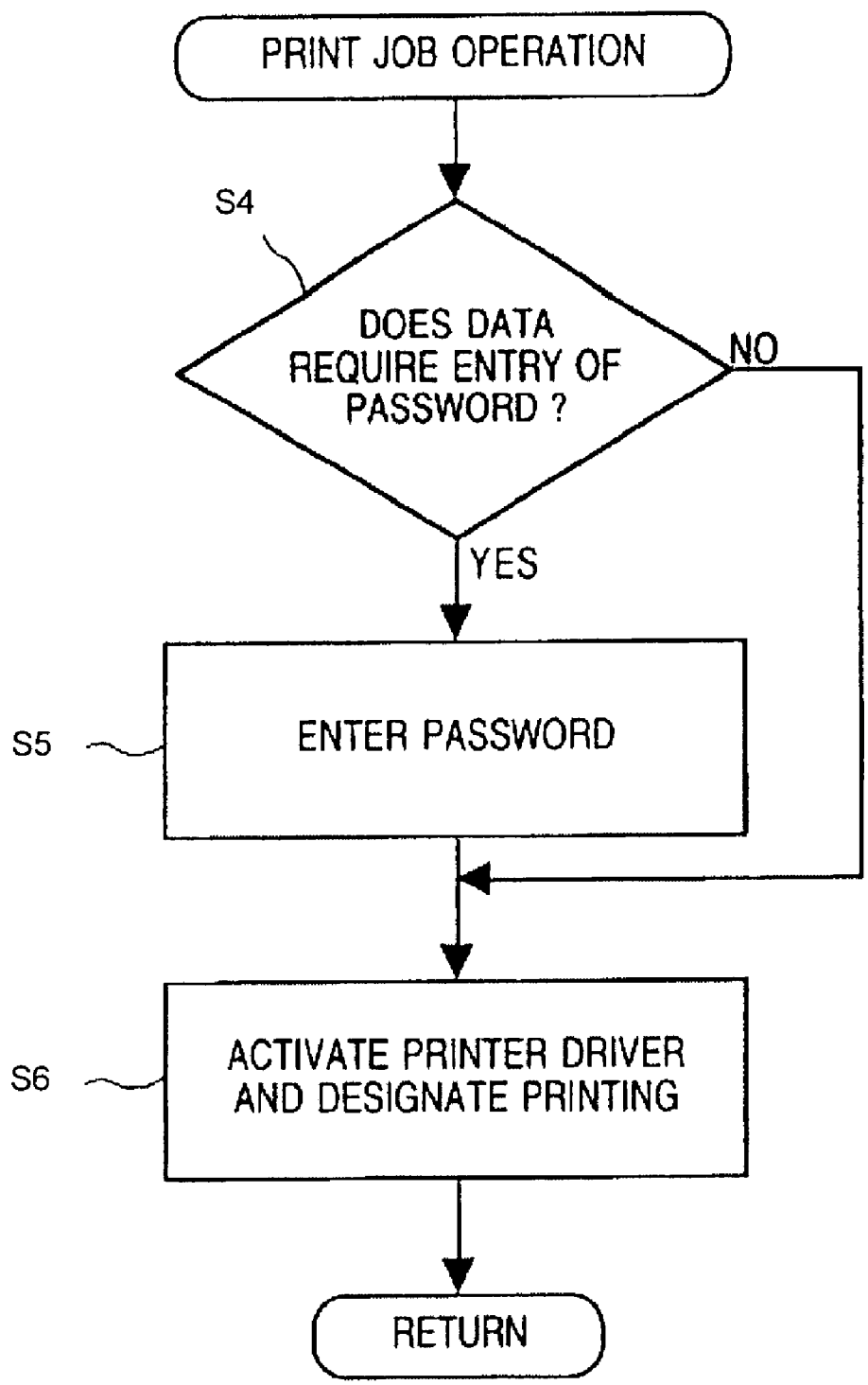
FIG. 1 illustrates a flow diagram of a conventional print job operation routine.
Figure 2:
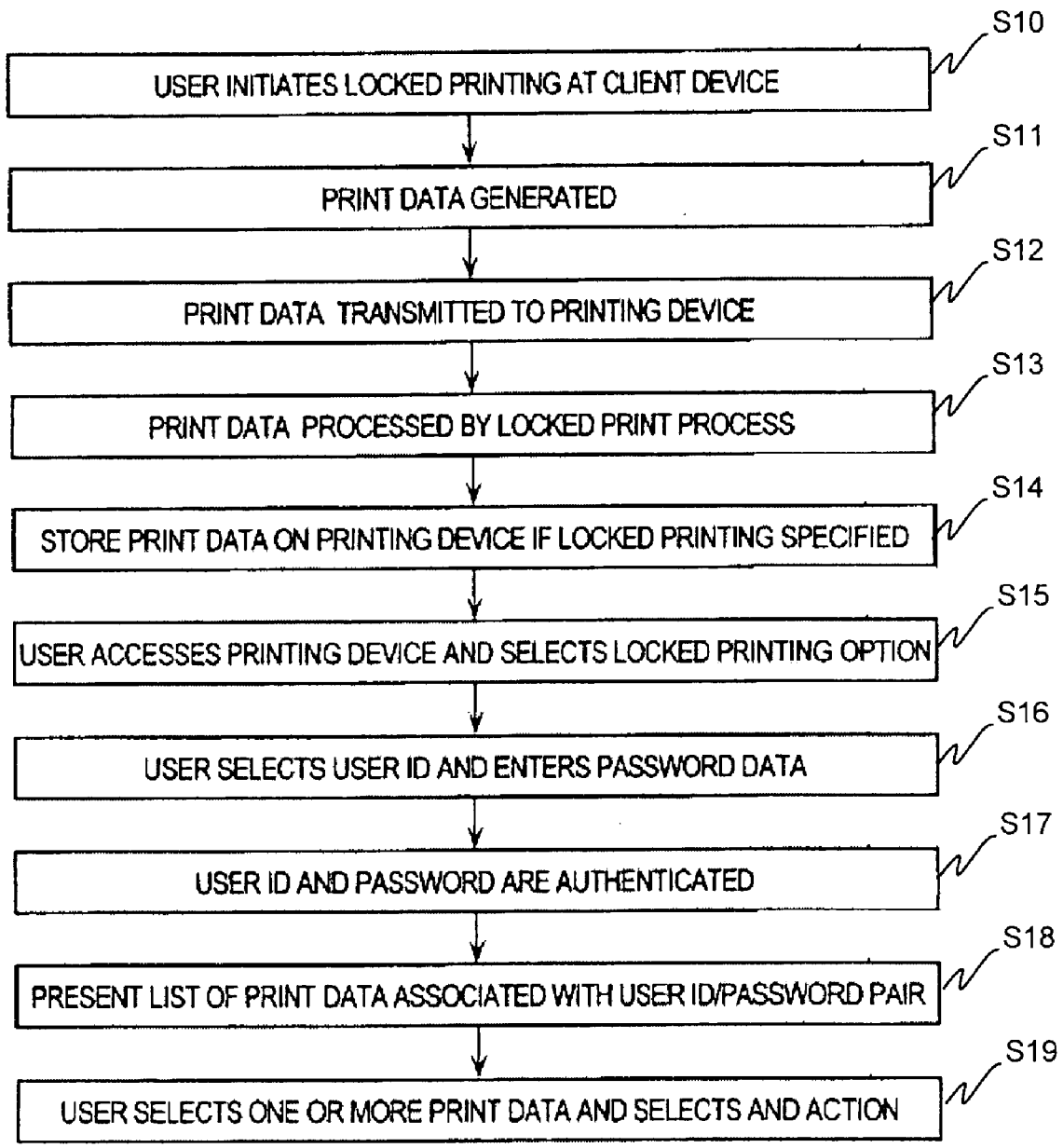
FIG. 2 illustrates a flow diagram for a conventional locked print process.
Figure 3:
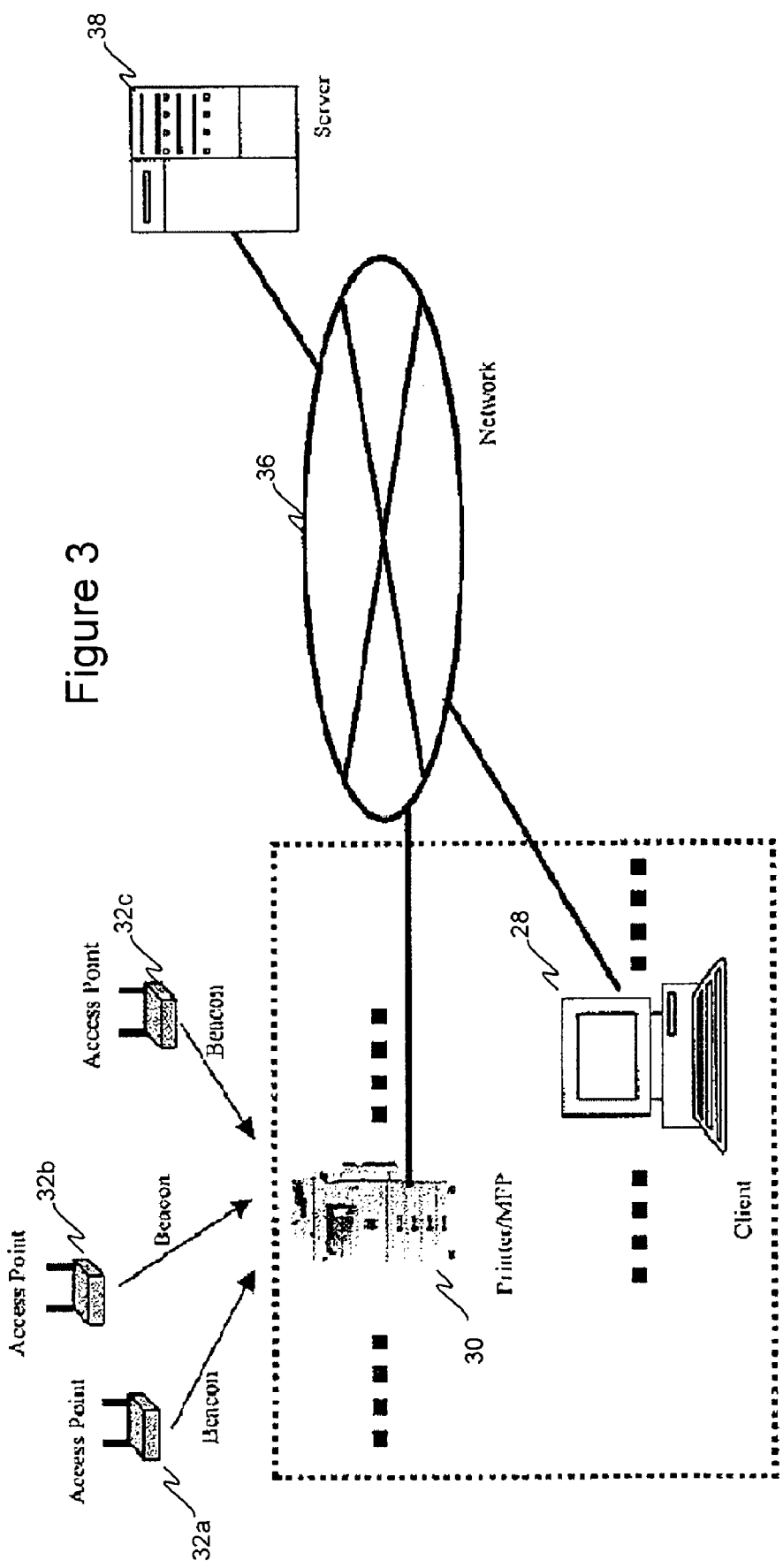
FIG. 3 illustrates an exemplary configuration of a printing system according to an embodiment of the invention.

Referring now to the drawings, wherein like reference numerals designate identical or corresponding parts throughout the several views, FIG. 3 shows the configuration of a printing system according to an embodiment of the invention. As illustrated in FIG. 3, the printing system includes a network 36, a client device 28, a printing device 30, a server 38, and a plurality of wireless access points 32a-32c (e.g., at least three). However, it should be noted that the printing system is not so limited, and may include a plurality of the client device 28, the printing device 30, and/or the server 38.

The network 36 may include one or a combination of a Local Area Network (LAN), Wide Area Network (WAN), or WLAN. The client device 28, the printing device 30, and the server 38 may either be connected to the network 36 via a wireless communication path (e.g., any of the wireless access points 32a-32c), or a wired communication path.

It is noted that the client device 28, the printing device 30, and the server 38 need not be connected to each other over the same network. For example, the client device 28 may be connected to the server 38 over a first communication path (e.g., the Internet, a LAN, or mobile network), and the server 38 may be connected to the printing device 30 over a second communication path that is different from the first communication path.

In one embodiment of the invention, the server 38 has two functions: (1) a Print Server Function, and (2) a Position Management Function. The server 38 is configured to receive print data from the client device 28. The print data includes a request to print a print job at the printing device 30. The server 38 transfers the print data received from the client device 28 to the print device 30, designated in the print data (e.g., in the header). The Print Server Function controls switching between the locked and unlocked print modes. The Position Management Function obtains a distance between the client device 28 and the printing device 30 by using, for example, the printing system illustrated in FIG. 5.

In one embodiment, each of the wireless access points 32a-32c generates a beacon in accordance with any of the IEEE 802.11 standards. The wireless access points 32a-32c may generate beacons in accordance with any of the IEEE 802.11a, b, g, or n standards, and transmit the beacons at a rate of 1 Mbits/s. The beacons may be used by the printing system to determine positions of the client device 28 and the printing device 30, as further discussed below. The 802.11 standards are also referred to as WLAN or WiFi, as disclosed in "Wi-Fi." *Wikipedia: The Free Encyclopedia.* 20 Mar. 2009, which is incorporated by reference in its entirety.

In another embodiment, the wireless access points may implement GeoFi, for example, as disclosed in K. Piersol et al., "GeoFi—A System for Indoor Location Using WiFi Access Point Labeling," California Research Center, Ricoh Innovations, Inc., Tech. Rep. No. 34 (2008), which is incorporated by reference in its entirety. When implementing GeoFi, geographic coordinates of the wireless access points 32a-32c are encoded into the Service Set Identifier (SSID) of the wireless access points 32a-32c, which serve as location beacons.

Figure 4:
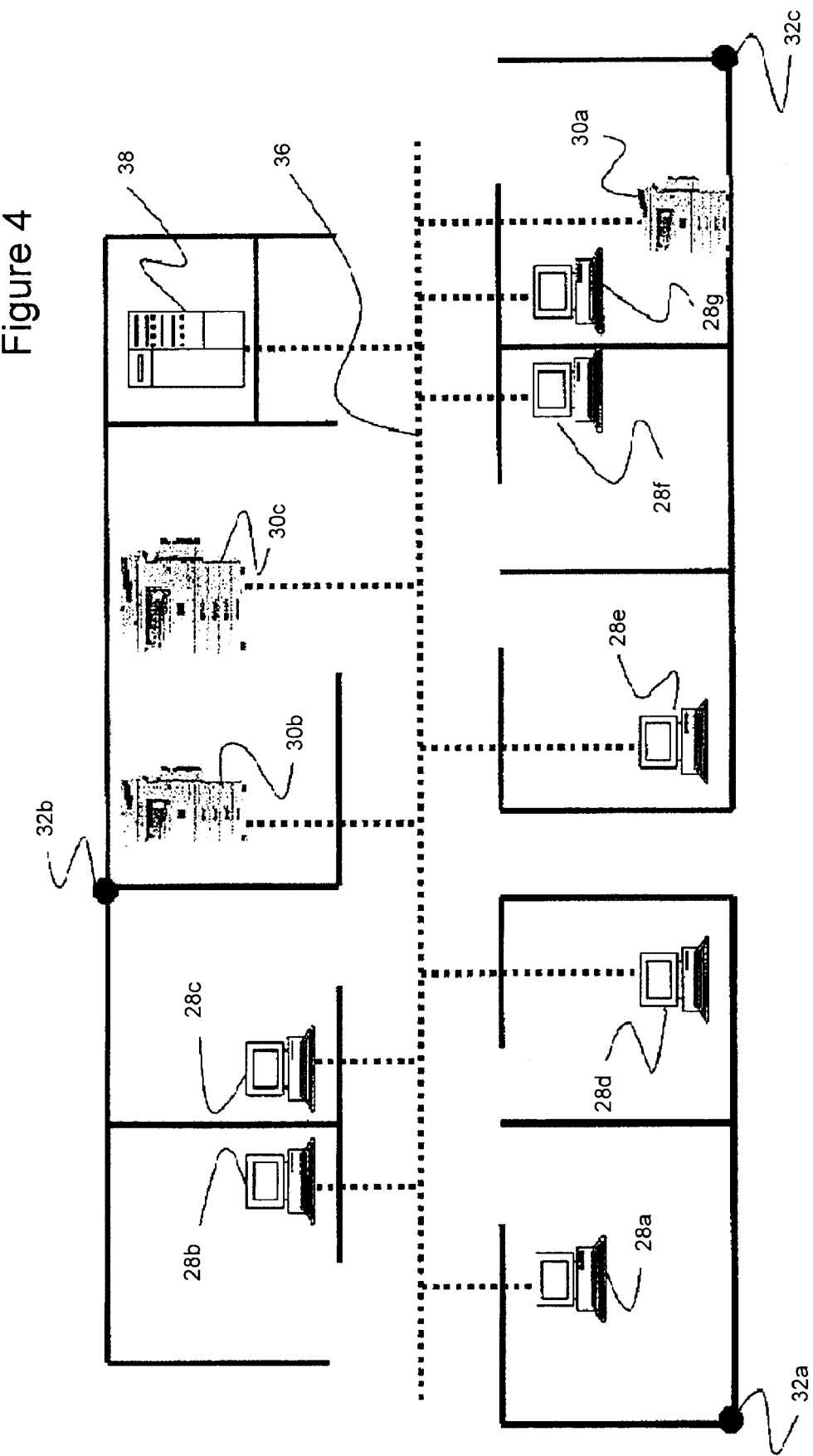
FIG. 4 illustrates an exemplary embodiment of the printing system of FIG. 3 employed in a business office.

FIG. 4 illustrates an example of the printing system implemented in an environment such as a business office. The business office may include the network 36, the plurality of wireless access points 32a-32c, a plurality of client devices 28a-28g, a plurality of printing devices 30a-30c, and the server 38. A user of one of the client devices 28a-28g may request a print job to be printed at a designated one of the printing devices 30a-30c. The request to print the print job is transmitted to the server 38 over the network 36. The server 38 receives the request to print the print job and sets a print mode corresponding to the print job based on a distance between the one of the client devices 28a-28g of the user and the designated one of the printing devices 30a-30c. After setting the print mode, the server 38 sends the print job and the corresponding print mode setting to the designated one of the printing devices 30a-30c.

Figure 5:
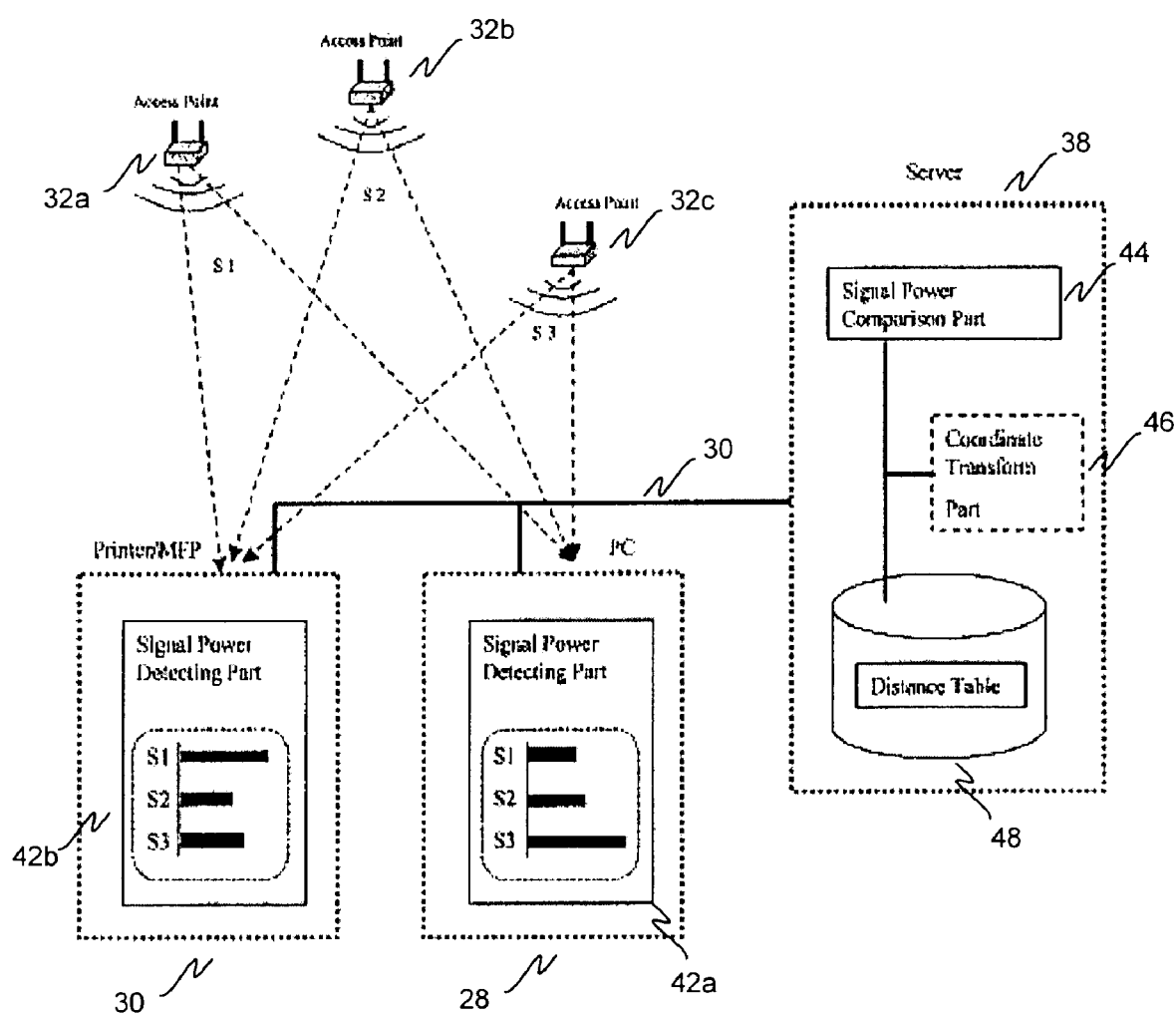
FIG. 5 illustrates an exemplary system for detecting distances between devices according to an embodiment of the invention.

FIG. 5 illustrates an exemplary embodiment of the printing system for detecting the distance between the client device 28 and the printing device 30. As illustrated in FIG. 5, the wireless access points 32a-32c transmit beacons S1-S3, and the powers of the beacons S1-S3 are measured by the client device 28 and the printing device 30, respectively. The beacons S1-S3 are received by each of the client device 28 and the printing device 30, which include signal power detecting parts 42a and 42b, respectively. The signal power detecting part 42a detects the signal power levels of the beacons S1-S3 received by the client device 28. The signal power detecting part 42b detects the signal power levels of the beacons S1-S3 received by the printing device 30. The signal power detecting parts 42a and 42b may detect the signal power levels of the beacons S1-S3 in real-time, periodically, at scheduled times, or in response to a request by the server 38, and send data representing the measured beacon powers over the network 36 connected to the server 38.

Further, as illustrated in FIG. 5, the server 38 may include a signal power comparison part 44, a coordinate transform part 46 (optional), and a Distance Table 48. The server 38 receives the detected signal power levels of the beacons S1-S3 from each of the client device 28 and the printing device 30. The detected signal power levels may be received in real-time, periodically, at scheduled times, or in response to a request by the server 38. Upon receipt of the detected signal power levels from the client device 28 and the printing device 30, the signal power comparison part 44 analyzes the signal power levels sent by the client device 28 and the printing device 30 to obtain the distance between them.

The positions of the client device 28 and the printing device 30 can be determined using any one or a combination of known systems/methods such as cellular-based approaches (e.g, using CDMA or GSM), GPS-based approaches, WLAN/Bluetooth, etc. Exemplary systems/methods for determining a position of a device are disclosed in R. Bill et al., "Indoor and Outdoor Positioning in Mobile Environments—a Review and some Investigations on WLAN-Positioning," Geographic Information Sciences, 10:2, pp. 91-98 (2004); E. Gryazin et al., "Indoor Positioning and Navigation Using WLAN Technology," Proceedings of the 6th conference "New Information Technology: Development and Application Perspectives", Taganrog State Radiotechnical University, Taganrog, Russia, pp. 10-23 (2003); and M. Hermersdorf, "Indoor Positioning with a WLAN Access Point List on a Mobile Device," WSW '06, Boulder, Colo., USA (2006), which are herein incorporated by reference in their entirety. In another embodiment, the positions of the client device 28 and the printing device 30 can be determined using the "System and Method for Registration Device Location," as disclosed in U.S. patent application Ser. No. 12/337,302, which is incorporated by reference in its entirety.

Figure 12:
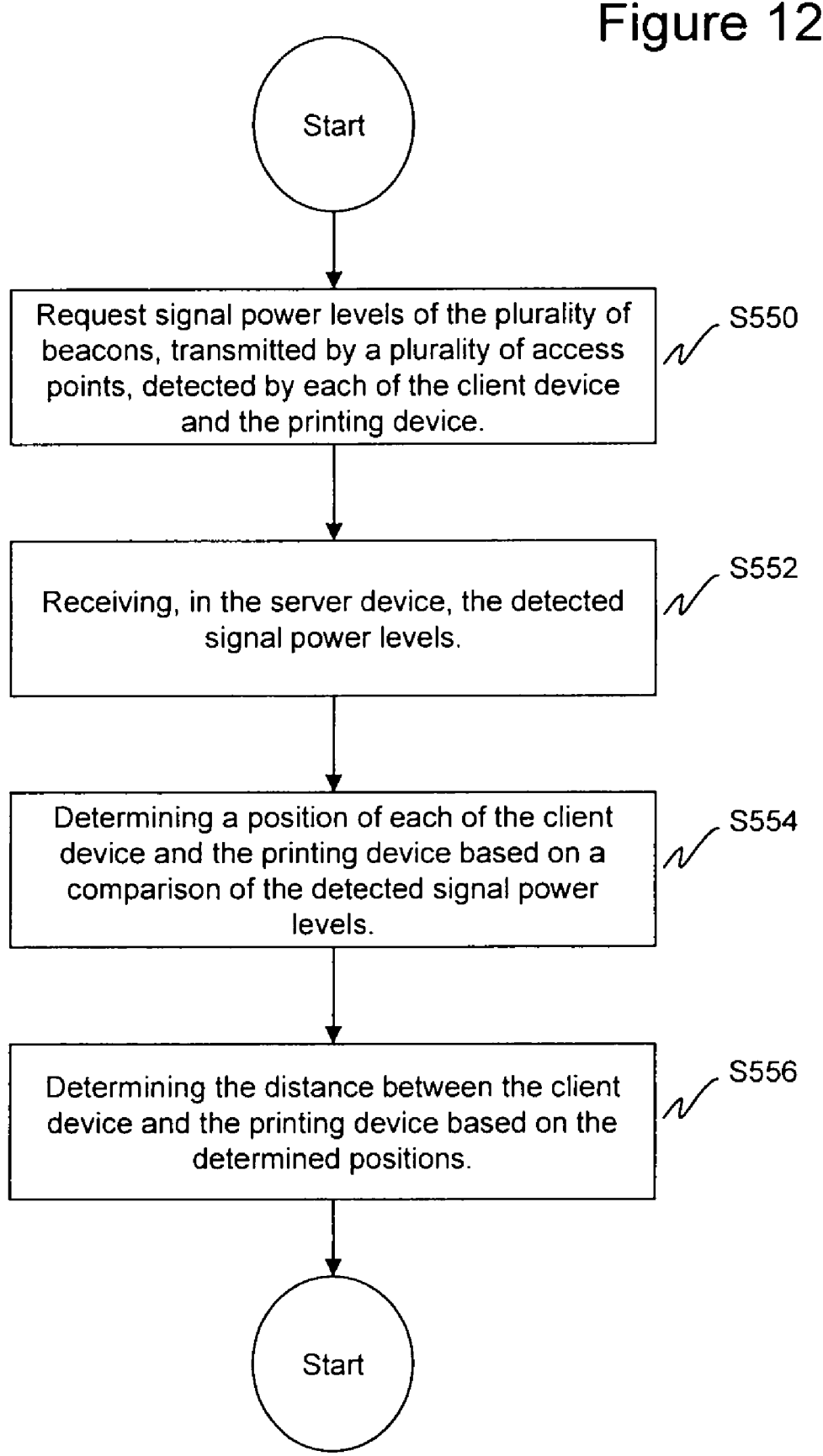
FIG. 12 illustrates a flow diagram of one embodiment of a process for determining the distance between the client device and printing device.

In one embodiment, the signal power comparison part 44 compares the obtained distance with a predetermined value (e.g., 1 m). The predetermined value can be set to any other value depending on user requirements. The signal power comparison part 44 outputs "0" data when the obtained distance is shorter than the predetermined value and outputs "1" data otherwise. The "0" and "1" data are stored in a Distance Table 48 of the server 38 in association with combinations of client devices and printing devices. The Distance Table 48 may be maintained within, or remotely accessible by, the server 38. An example of the Distance Table 48 is illustrated in FIG. 12, as further discussed below.

In an alternative embodiment, the signal power comparison part 44 may store the distance between devices in the Distance Table 48, and determine whether the distance is shorter than the predetermined value each time a print request for the devices is received.

Further, when the coordinate transform part 46 is included in the server 38, a map of the positions of the devices within a office can be created and/or displayed to a user. In this embodiment, the server 38 stores a map of the office layout, which does not include information about the positions of the device in the office (e.g., the client device 28 and the printing device 30). In one embodiment, the coordinate transform part 46 calculates the X-Y coordinates of the client devices 28a-28g and the printing devices 30a-30c and combines the position information with the map of the office layout, to create the map illustrated in FIG. 4.

Figure 6:
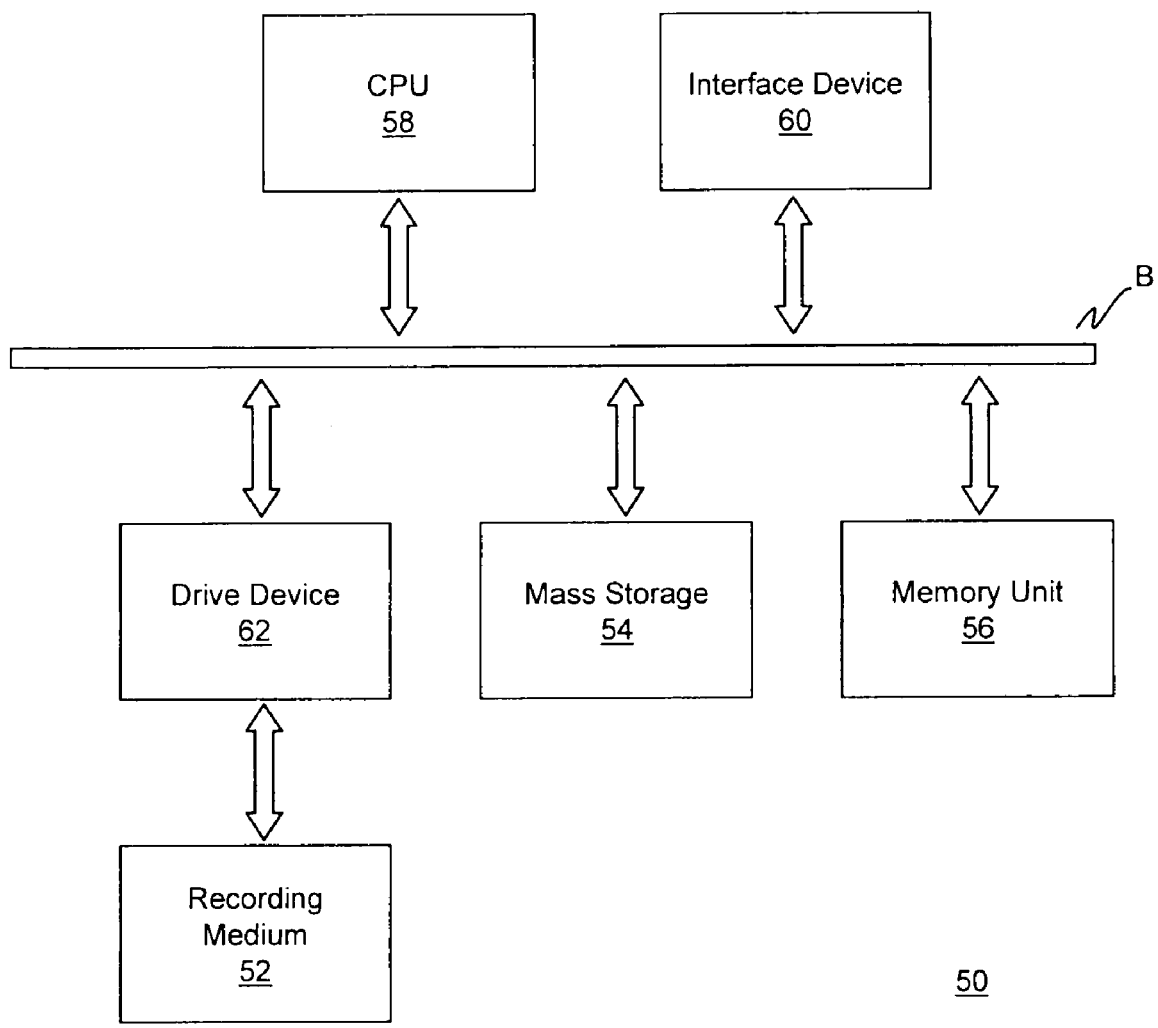
FIG. 6 illustrates hardware components of one embodiment of a client device and server.

FIG. 6 illustrates a computer system 50 upon which embodiments of the client device 28 and the server 38 may be implemented. The client device 28 and the server 38 may be implemented in, for example, workstations, personal computers, laptop computers, personal digital assistants (PDAs), cellular telephone devices, or other mobile devices. The computer system 50 includes a bus B or other communication mechanism for communicating information such as address information and data, and a processor/CPU 58 coupled with the bus B for processing the information. The computer system 50 also includes a main memory/memory unit 56, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 58. In addition, the memory unit 56 may be used for storing temporary variables or other intermediate information during the execution of instructions by the CPU 58. The computer system 50 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 58.

The computer system 50 may also include a disk controller coupled to the bus B to control one or more storage devices for storing information and instructions, such as mass storage 54 which may be a hard disk drive, for example, and drive device 62 (e.g., floppy disk drive, read-only compact disc drive, read/write compact disc drive, compact disc jukebox, tape drive, flash memory or a flash memory based drive, and removable magneto-optical drive). The storage devices may be added to the computer system 50 using an appropriate device interface (e.g., small computer system interface (SCSI), integrated device electronics (IDE), enhanced-IDE (E-IDE), direct memory access (DMA), or ultra-DMA).

The computer system 50 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) in order to carry out the desired functionality.

The computer system 50 may also include a display controller coupled to the bus B to control a display, such as a cathode ray tube (CRT), organic light emitting diode (OLED) display, or liquid crystal display (LCD), for displaying information to a computer user. The computer system may include input devices, such as a keyboard, pointing device, or touch display, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system 50 performs a portion or all of the processing steps in response to the CPU 58 executing one or more sequences of one or more instructions contained in a memory, such as the memory unit 56. Such instructions may be read into the memory unit from another computer-readable medium, such as the mass storage 54 or a removable media 52. One or more processors in a multi-processing arrangement may also be employed to execute the sequences of instructions contained in memory unit 56. In alternative embodiments, hard-wired circuitry may be used in place of or in combination with software instructions. Thus, embodiments are not limited to any specific combination of hardware circuitry and software.

As stated above, the computer system 50 includes at least one computer-readable medium 52 or memory for holding instructions programmed according to the teachings described herein and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other storage medium from which a computer can read.

Stored on any one or on a combination of computer-readable media is software for controlling the computer system 50, for driving a device or devices, and for enabling the computer system 50 to interact with a human user. Such software may include, but is not limited to, device drivers, operating systems, development tools, and applications software. Such computer-readable media further includes the computer program product for performing all or a portion (if processing is distributed) of the processing described herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The term "computer-readable medium" as used herein refers to any medium that participates in providing instructions to the CPU 58 for execution. A computer-readable medium may take many forms, including but not limited to, non-volatile media, and volatile media. Non-volatile media includes, for example, optical, magnetic disks, and magneto-optical disks, such as the mass storage 54 or the removable media 52. Volatile media includes dynamic memory, such as the memory unit 56.

Various forms of computer-readable media may be involved in carrying out one or more sequences of one or more instructions to the CPU 58 for execution. For example, the instructions may initially be carried on a magnetic disk of a remote computer. The remote computer can load the instructions remotely into a dynamic memory and send the instructions over a telephone line using a modem. A modem local to the computer system 50 may receive the data on the telephone line and use an infrared transmitter to convert the data to an infrared signal. An infrared detector coupled to the bus B can receive the data carried in the infrared signal and place the data on the bus B. The bus B carries the data to the memory unit 56, from which the CPU 58 retrieves and executes the instructions. The instructions received by the memory unit 56 may optionally be stored on mass storage 54 either before or after execution by the CPU 58.

The computer system 50 also includes a communication interface 60 coupled to the bus B. The communication interface 58 provides a two-way data communication coupling to a network that is connected to, for example, a local area network (LAN), or to another communications network such as the Internet. For example, the communication interface 60 may be a network interface card to attach to any packet switched LAN. As another example, the communication interface 60 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 60 sends and receives electrical, electromagnetic, or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, CAT 6 cable, coaxial cable, optical fiber, etc). The signals through the various networks and the signals on the network and through the communication interface 60, which carry the digital data to and from the computer system 50 may be implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 50 can transmit and receive data, including program code, through the network and the communication interface 60. Moreover, the network may provide a connection to a mobile device such as a personal digital assistant (PDA) laptop computer, or cellular telephone.

Alternatively, the client device 28 may be implemented in a digital copier/printer multi-function machine (MFP), as further discussed below. For example, the client device 28 may capture an image, which is transmitted to the printing device 30 for outputting.

Figure 7A:
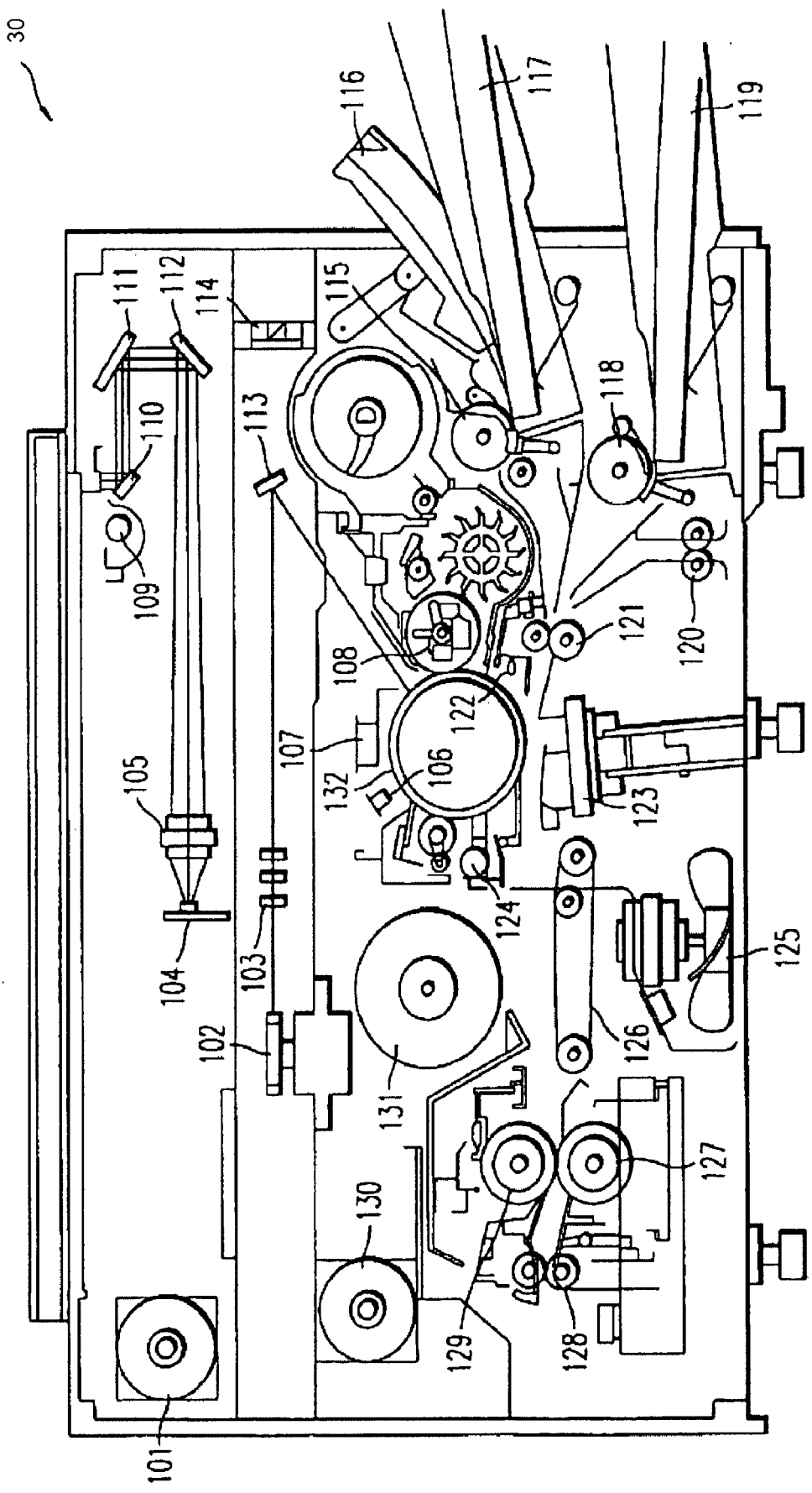
FIG. 7A illustrates hardware components of an exemplary printing device.

FIG. 7A illustrates an exemplary mechanical layout of the printing device 30 illustrated in FIG. 3, which may correspond to a digital copier/printer multi-function machine (MFP). In FIG. 7A, 101 is a fan for the scanner, 102 is a polygon mirror used with a laser printer, and 103 designates an F theta lens used to collimate light from a laser. Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the MFP, and 115 is a first paper feed roller used for feeding paper from the first paper cassette 117, and 116 is a manual feed table. Similarly, element 118 is a second paper feed roller for the second cassette 119. Reference numeral 120 designates a relay roller, 121 is a registration roller, 122 is an image density sensor, and 123 is a transfer/separation corona unit. Reference numeral 124 is a cleaning unit, 125 is a vacuum fan, element 126 is a transport belt, 127 is a pressure roller, and 128 is an exit roller. Reference numeral 129 is a hot roller used to fix toner onto the paper, 130 is an exhaust fan, and 131 is the main motor used to drive the digital copier/printer multi-function machine.

Figure 7B:
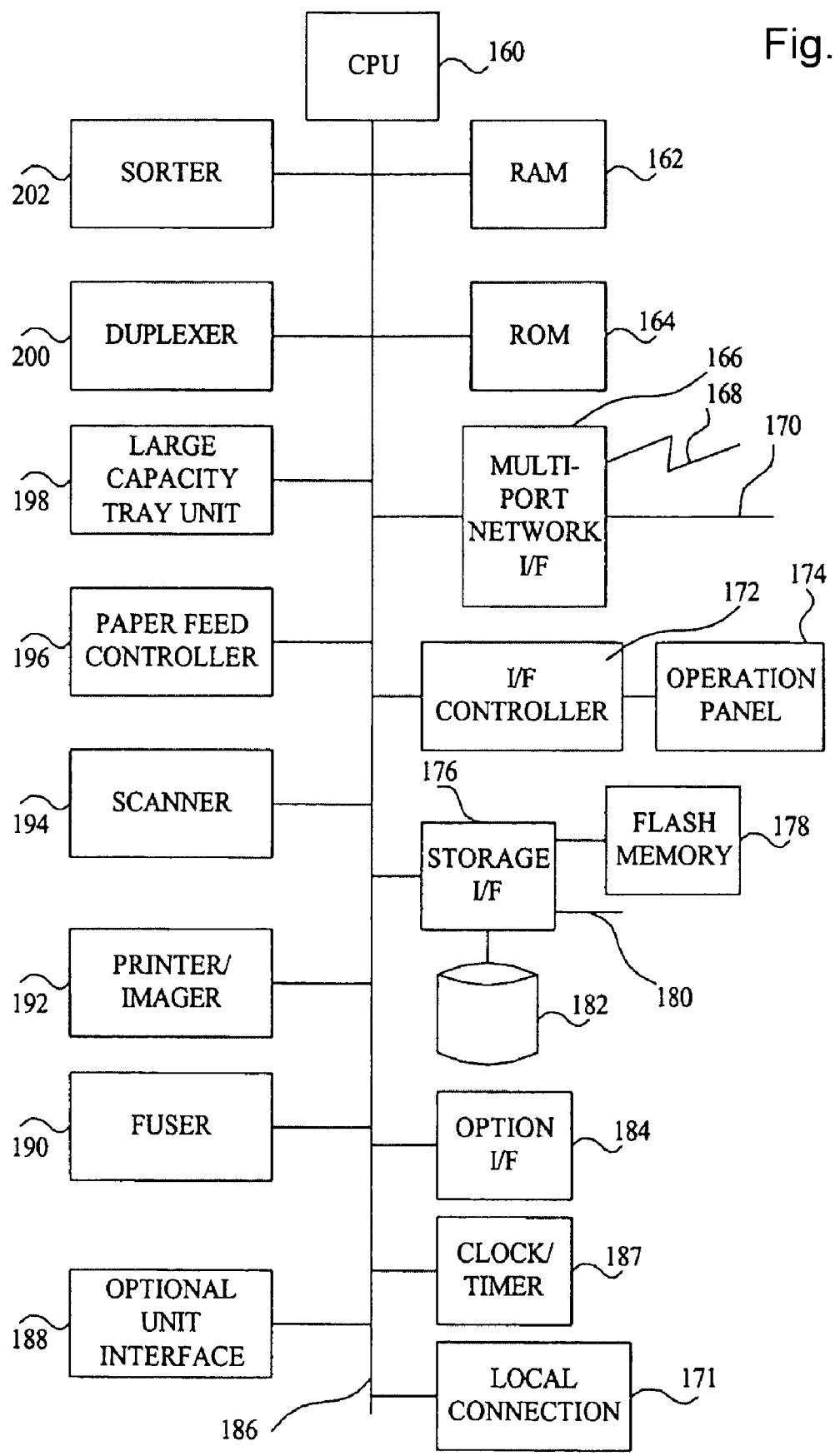
FIG. 7B illustrates electronic components of the printing device illustrated in FIG. 7A.

FIG. 7B illustrates a block diagram of the electronic components of the printing device 30 illustrated in FIG. 7A. The CPU 160 is a microprocessor and acts as the system controller. There is a random access memory (RAM) 162 to store dynamically changing information including operating parameters of the digital copiers. A read-only memory (ROM) 164 stores the program code used to run the printing device 30 and also information describing the static-state data such as model number, serial number, and default parameters that would not change over the life of the machine. When the device needs to boot up from either a hard disk or flash memory, the ROM memory 164 stores the boot sequence.

Similar to the computer system 50 discussed above, the printing device 30 may perform a portion or all processing steps in response to the CPU 160 executing one or more sequences of one or more instructions contained in a memory, such as the ROM 164 or of one of the memory types discussed above with respect to the computer system 50. The instructions may be read into the memory from another computer-readable medium, as discussed above, such as mass storage or removable media. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

There is provided a multi-port communication interface 166, which allows the printing device 30 to communicate with external devices. Reference numeral 168 represents a telephone or other communication line including a wireless channel. Further information of the multi-port communication interface is described with respect to FIG. 7C. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display may be included within the operation panel 174 to display parameters and messages of the apparatus. The operation panel also can be a touch panel in which the display and function buttons may change according to the context.

A local connection interface 171 is a connection through local port such as RS232, USB and IEEE 1394. This interface 171 allows external devices to be attached to the apparatus.

A storage interface 176 connects storage devices to the system bus 186. The storage devise include a flash memory 178 and a disk 182. There is a connection 180 connected to the storage interface 176 which allows for additional memory devices to be connected. The flash memory 178 is used to store semi-static data which describes parameters of the device which infrequently change over the life of the apparatus, including the option configuration, network access parameters, and work group, and also can be used to store dynamic data that describes parameters dynamically changing such as print count. An option interface 184 allows additional option devices to be attached and controlled. A clock/timer 187 is utilized to keep track of both the time and date and also to measure elapsed time.

On the left side of FIG. 7B, the various sections making up the printing device 30 are illustrated. Reference numeral 202 designates a sorter and contains sensors and actuators used to sort the output of the digital copier/printer multi-function machine. There is a duplex 200 that allows a duplex operation to be performed and includes conventional sensors and actuators. The printing device 30 includes a large capacity tray unit 198 that allows paper trays holding a large number of sheets to be used. The large capacity tray unit 198 includes conventional sensors and actuators.

A paper feed controller 196 is used to control the operation of feeding paper into and through the printing device 30. A scanner 194 is used to scan images into the printing device 30 and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 192, which prints the output of the printing device 30 and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an optional unit interface 188 used to connect optional units such as an automatic document feeder, a different type of sorter/collator, or other elements that can be added to the printing device 30.

Figure 7C:
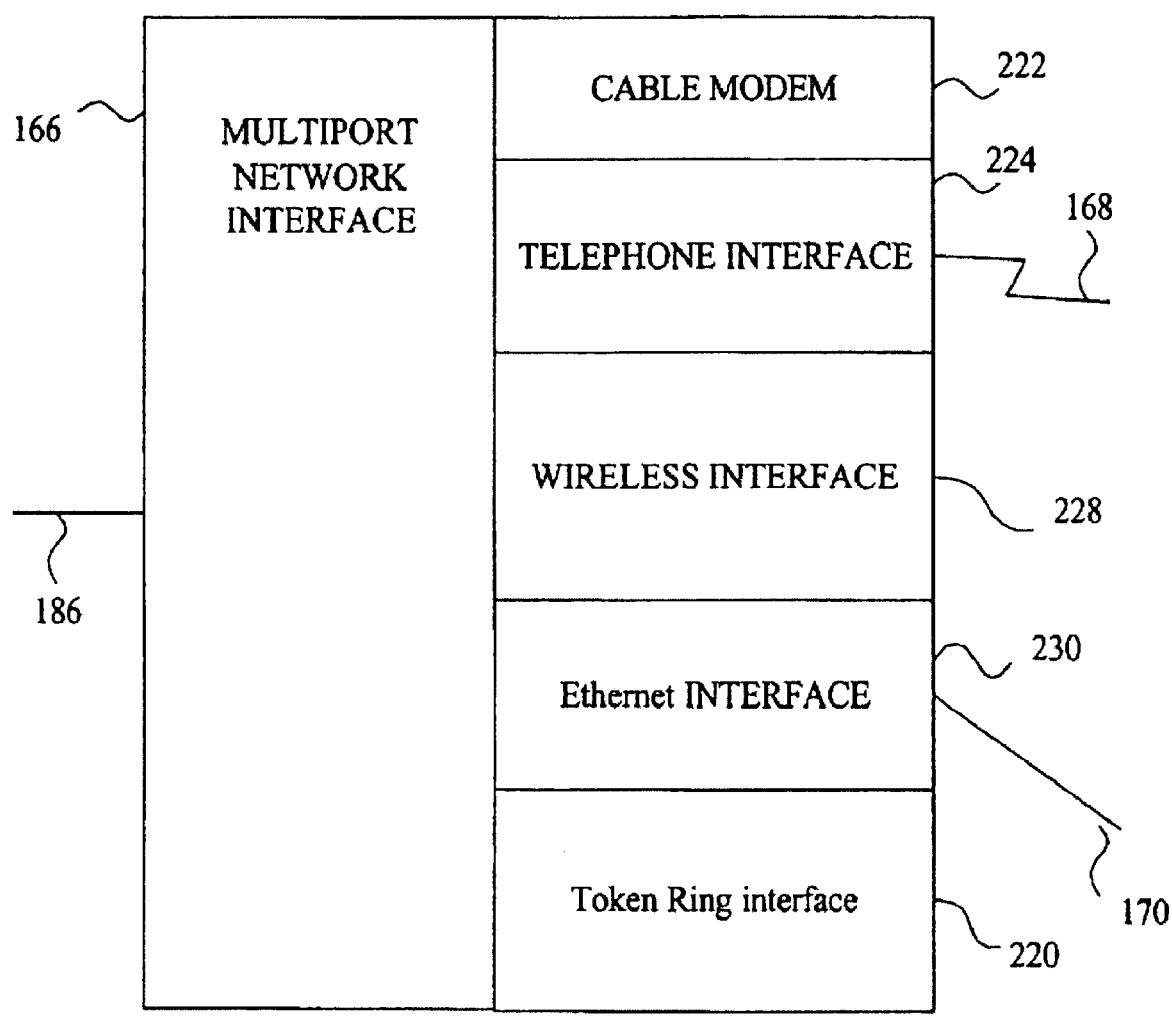
FIG. 7C illustrates details of the multi-port communication interface illustrated in FIG. 7B.

FIG. 7C illustrates details of the multi-port network interface 166. The printing device 30 may communicate to external devices through a Token Rink interface 220, a cable modem unit 222 that has a high speed connection over cable, a conventional telephone interface 224 that connects to a telephone line 168, wireless interface 228, and an Ethernet interface 230. Other interfaces (not shown) include, but are not limited to, a Digital Subscriber line. The multi-port network interface does not need to have all the interfaces described in FIG. 7C.

The CPU or other microprocessor or circuitry executes a monitoring process to monitor the state of each of the sensors of the printing device 30, and a sequencing process is used to execute the instructions of the code used to control and operate the printing device 30. Additionally, there is (1) a central system control process executed to control the overall operation of the printing device 30 and (2) a communication process used to assure reliable communication to external devices connected to the printing device 30. The system control process monitors and controls data storage in a static state (e.g., the ROM 164 of FIG. 7B), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine, but this embodiment is equally applicable to other business office machines or devices such as an analog copier, a facsimile machine, a printer, a facsimile server, or other business office machines and business office appliances that are configured to store data for future processing.

Figure 8:
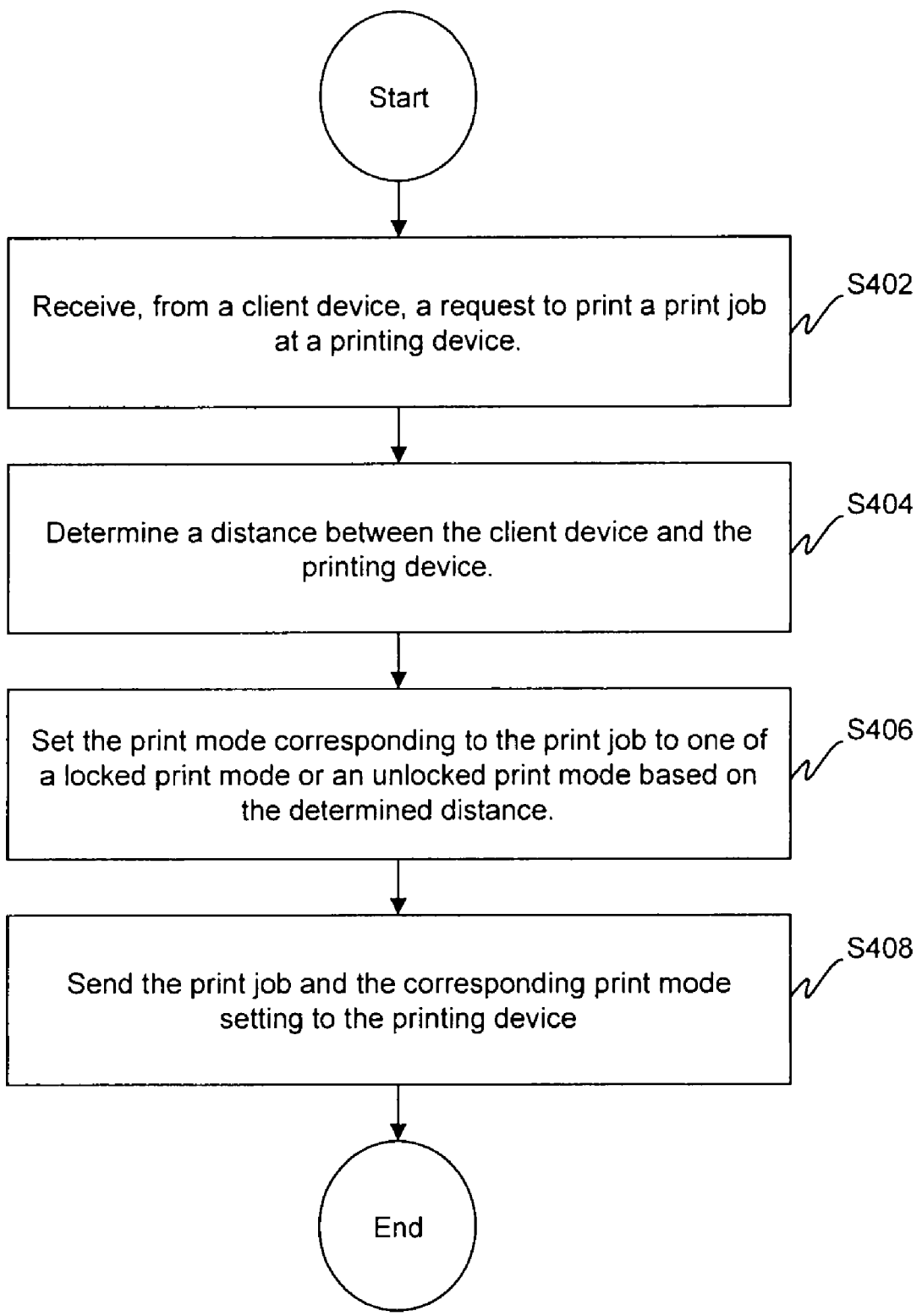
FIG. 8 illustrates a flow diagram of a process for switching between locked and unlocked print modes according to one embodiment of the invention.

FIG. 8 provides an overview of the process performed by the server 38 to set the print mode corresponding to the print job. In step S402, the server 38 receives, from the client device 28 a request to print the print job at the printing device 30. In step S404, the server 38 determines a distance between the client device 28 and the printing device 30. Further, in step S406, the server 38 sets the print mode corresponding to the print job to one of a locked print mode and an unlocked print mode based on the distance determined in step S404. In one embodiment, the server 38 sets the print mode corresponding to the print mode to the locked print mode, when the determined distance between the client device 28 and the printing device 30 is not smaller than a predetermined distance, in step S404. Further, the server 38 sets the print mode corresponding to the print job to the unlocked print mode when the determined distance between the client device 28 and the printing device 30 is smaller than the predetermined distance, in step S404. After the server 38 sets the print mode, the server 38 sends the print job and the corresponding print mode to the printing device 30, in step S408.

Figure 9:
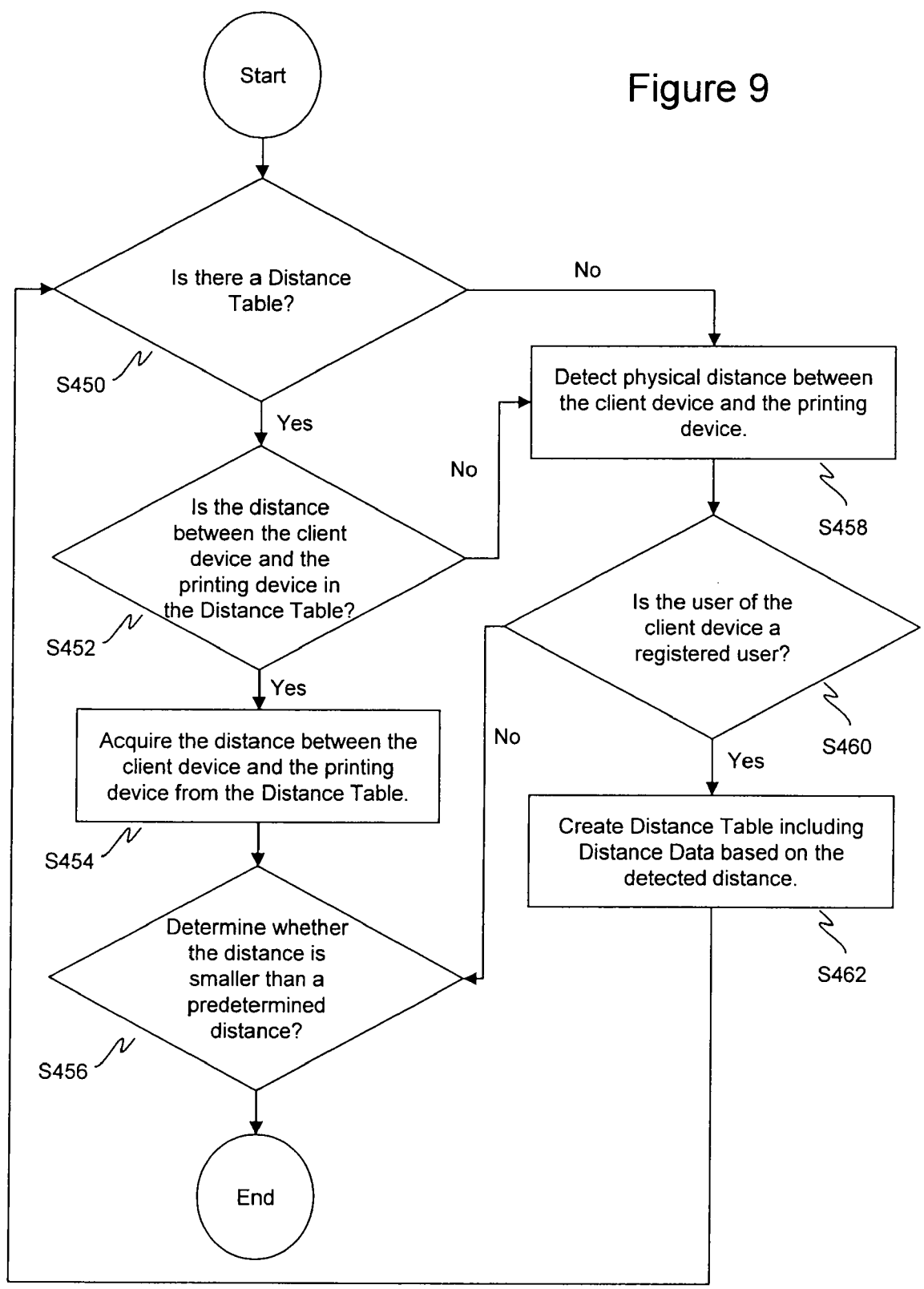
FIG. 9 illustrates a flow diagram of one embodiment of a process for determining whether a distance between the client device and printing device is smaller than a predetermined distance.

FIG. 9 illustrates an exemplary process for determining the distance between the client device 28 and the printing device 30, as illustrated in step S404 of FIG. 8. As illustrated in FIG. 9, the server 38 determines the availability of the Distance Table 48, in step S450. If the Distance Table 48 is available, the server 38 determines whether the Distance Table 48 includes information on the distance between the client device 28 and the printing device 30, in step S452. If the Distance Table 48 is determined to include the information on the distance between the client device 28 and the printing device 30, the server 38 acquires the distance information from the Distance Table 48, in step S454. The process then proceeds to step S456, at which time the server 38 determines whether the distance between the client device 28 and the printing device 30 is smaller than the predetermined distance based on the distance information acquired from the Distance Table 48.

However, if the server 38 determines that the Distance Table 48 is not available in step S450, or that the Distance Table 48 does not include the information on the distance between the client device 28 and the printing device 30 in step S452, the server 38 proceeds to step S458, at which time the physical distance between the client device 28 and the printing device 30 is detected. After the physical distance between the client device 28 and the printing device 30 is detected in step S458, the server 38 determines whether the distance information should be registered in the Device Table 48. For example, the server 38 may determine that the distance information should be registered when a user of the client device 28 is a registered user in a predetermined management unit (e.g., a floor, a division, etc.). The determination of whether the user is registered may be based on any information identifying the user (e.g., a user ID or an identifier of the client device 28). The information identifying the user may be sent with, or separately from, the request to print the print job at the printing device 30.

The process proceeds to step S456, if the user is not a registered user of the predetermined management unit, at which time the server 38 determines whether the distance between the client device 28 and the printing device 30 is smaller than the predetermined distance based on the physical distance detected in step S458. If the user of the client device 28 is a registered user of the predetermined management unit, in step S462, the server 38 records the distance information detected in step S458 in the Distance Table 48. The process then proceeds to step S452. However, it is noted that the process for determining the distance between the client device 28 and the printing device 30 need not include each of the steps illustrated in FIG. 9. Rather, in other embodiments, the determination process may include any one or a combination of those steps. For example, in one embodiment, the determination process may create the Distance Table 48, regardless of whether a user of the client device is a registered user.

Figure 10:
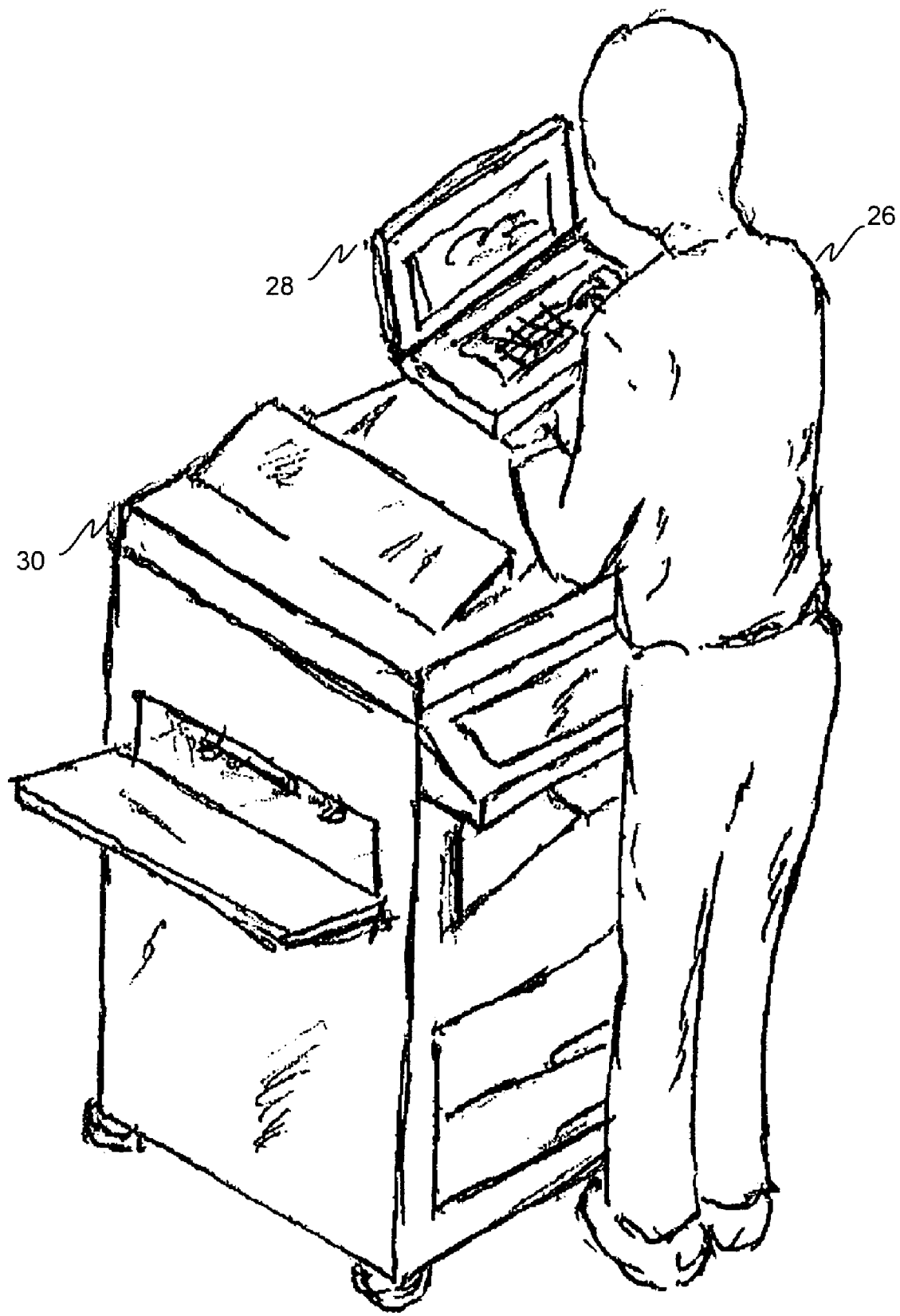
FIG. 10 illustrates an example of a user of the printing system.

FIG. 10 illustrates an exemplary user 26 who is not a registered user (e.g., another floor user) of the predetermined management unit. As illustrated in FIG. 10, the user 26 operates the client device 28, which is a mobile device that is temporarily operated via a wireless connection (e.g., WLAN). Accordingly, the distance information between the client device 28 and the printing device 30 is not stored in the Distance Table 48.

Figure 11:
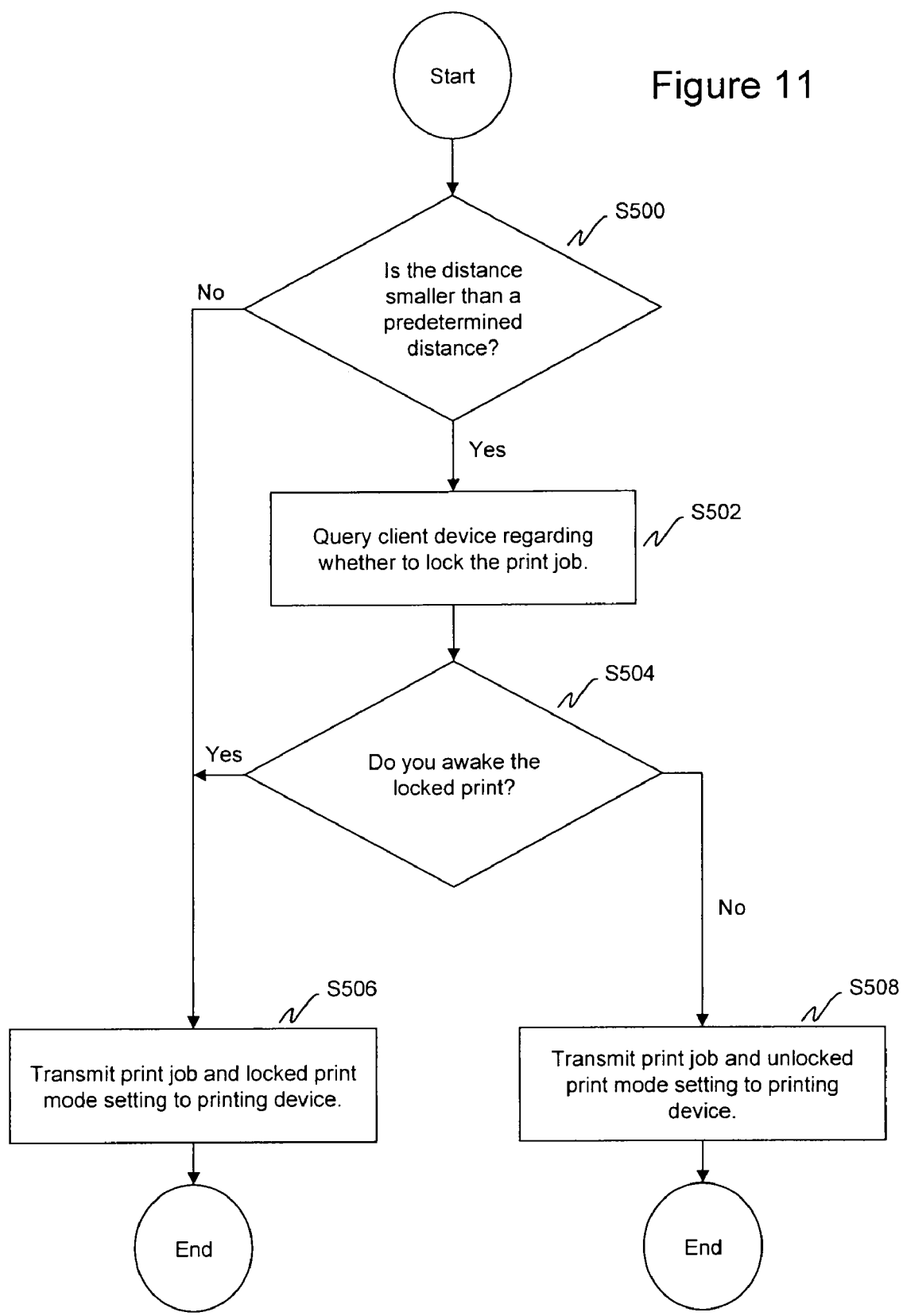
FIG. 11 illustrates a flow diagram of one embodiment of a process for setting a print mode corresponding to a print job.

FIG. 11 illustrates an exemplary process for setting the print mode corresponding to the print job, as illustrated in step S406 of FIG. 8. In step S500, the server 38 determines whether the distance between the client device 28 and the printing device 30 is smaller than a predetermined distance. If the distance between the client device 28 and the printing device 30 is not smaller than the predetermined distance, the server 38 transmits the print job and a locked print mode setting to the printing device 30, in step S506.

However, if the distance between the client device 28 and the printing device 30 is smaller than the predetermined distance, the process proceeds to step S502, at which time the server 38 queries a user of the client device 28 regarding whether to lock the print job. In one embodiment, the query includes transmitting a message to the client device 36 with a prompt for the user to select whether to lock the print job. For example, the server may transmit a command to the client device 28 to display the message "Do you awake the Locked Print?" The user may respond to the prompt by simply selecting "YES" or "NO." Based on the response to the query in step S502, the server 38 determines whether the print job should be locked in step S504. If the print job should be locked, the server 38 transmits the print job and the locked print mode setting to the printing device 30, in step S506. If the print job should not be locked, the server 38 transmits the print job and the unlocked print mode setting to the printing device 30, in step S508.

However, it is noted that the query of step S504 is not required. Rather, in another embodiment, the server 38 may simply proceed to step S508 and transmit the print job and the unlocked print mode setting to the printing device 30. In an alternate embodiment, the server 38 may perform the query regarding whether to lock the print job if the distance is determined not to be smaller in step S500. In such a case, the query may be performed in addition to, or in place of, the query performed in step S504.

The locked print mode setting includes information identifying a user ID and/or pin code required to unlock a corresponding print job for printing. In one embodiment, a table of at least one user ID and/or pin code is stored on the server 38. Each of the at least one user ID and/or pin code may be stored in association with a particular user or client device. In other embodiments, the table of at least one user ID and/or pin code may be stored in the printing device 30, or provided by the client device 28.

When the server 38 stores the table of at least one user ID and/or pin code, information identifying one of the at least one user ID and/or pin code is transmitted with, or separately from, the request to print the print job by the client device 28. Examples of the information identifying the one of the user ID and/or pin code include an identifier of the client device 28, the user ID, etc.

FIG. 12 illustrates an exemplary process for detecting the physical distance between the client device 28 and the printing device 30, as illustrated in step S458 of FIG. 9. In step S550, the server 38 requests signal power levels of the plurality of beacons, transmitted by a plurality of wireless access points (e.g., the wireless access points 32a-32c), detected by each of the client device 28 and the printing device 30. Alternatively, the client device 28 and the printing device 30 may push the signal power levels of the plurality of beacons to the server 38. In step S552, the server 38 receives the detected signal power levels. The server 38 determines the positions of the client device 28 and the printing device 30 based on a comparison of the detected signal power levels, in step S554. In step S556, the server 38 determines the distance between the client device 28 and the printing device 30 based on the positions determined in step S554.

FIG. 13 illustrates an exemplary embodiment of the Distance Table 48. For example, Device000 to Device002 represent the printing devices 30a-30c, respectively, illustrated in FIG. 4. User000 to User006 represent the client devices 28a-28g of FIG. 4, respectively. The Distance Table 48 stores the value "1" when the distance between a respective client device and printing device is greater than or equal to the predetermined distance, and stores the value "0" when the distance between the respective client device and printing device is smaller than the predetermined distance. In the embodiment of FIG. 12, only the distance between the client device 28g and the printing device 30a is smaller than the predetermined distance. For example, the predetermined distance may be set such that a print job to be printed by a printing device in the same room, as the requesting client device, is unlocked. Further, in other embodiments the Distance Table 48 may store any position information of the devices, information regarding the distance between the devices, or any other information that indicates whether the distance of the respective client device and printing device is smaller than the predetermined distance.

FIG. 14 illustrates an exemplary embodiment of a print log 600 that may be displayed by the server 38. The print log 600 may include, for each requested print job, information regarding the client device that sent the request, a User ID, a Pin Code, a selected output device (e.g., a printing device), a distance between the device, a status 1 defining the print mode set for the respective print job, and a status 2 defining whether the respective print job has been printed. In FIG. 14, the print job requested from User006 is set to an unlocked print mode because the distance between User006 (i.e., client device 28g of FIG. 4) is shorter than the predetermined distance.

Numerous modifications and variations of the present invention are possible in light of the above teachings. It is therefore to be understood that within the scope of the appended claims, the invention may be practiced otherwise than as specifically described herein.

The invention claimed is:

1. A method for setting a print mode of a printing device, comprising:
   receiving, from a client device, a request to print a print job at the printing device;
   automatically determining a distance between the client device and the printing device based on signal power levels of a plurality of beacons detected by each of the client device and the printing device, the beacons being transmitted by a plurality of wireless access points;
   setting a print mode corresponding to the print job to one of a locked print mode or an unlocked print mode based on the determined distance between the client device and the printing device; and
   sending the print job and the corresponding print mode setting to the printing device.

2. The method of claim 1, wherein the setting step comprises:
   when the distance between the client device and the printing device is determined not to be smaller than a predetermined distance, setting the print mode corresponding to the print job to the locked print mode, and
   when the distance between the client device and the printing device is determined to be smaller than the predetermined distance, setting the print mode corresponding to the print job to the unlocked print mode.

3. The method of claim 1, wherein the automatically determining step comprises:
   determining the distance between the client device and the printing device based on distance information stored in a distance table.

4. The method of claim 1, wherein when the distance between the client device and the printing device is smaller than a predetermined distance, the setting step further comprises:
   prompting a user of the client device to select whether to set the print mode corresponding to the print job to the locked print mode; and
   setting the print mode corresponding to the print job based on the selection by the user.

5. The method of claim 1, wherein
   the locked print mode instructs the printing device to print the print job in response to receiving corresponding authentication information.

6. A server device, comprising:
   means for receiving, from a client device, a request to print a print job at a printing device;
   means for automatically determining a distance between the client device and the printing device based on signal power levels of a plurality of beacons detected by each of the client device and the printing device, the beacons being transmitted by a plurality of wireless access points;
   means for setting a print mode corresponding to the print job to one of a locked print mode or an unlocked print mode based on the determined distance between the client device and the printing device; and
   means for sending the print job and the corresponding print mode setting to the printing device.

7. The server device of claim 6, wherein the means for setting comprises:
   when the distance between the client device and the printing device is not smaller than a predetermined distance, means for setting the print mode corresponding to the print job to the locked print mode; and
   when the distance between the client device and the printing device is smaller than the predetermined distance, means for setting the print mode corresponding to the print job to the unlocked print mode.

8. The server device of claim 6, wherein the means for determining comprises:
   means for determining the distance between the client device and the printing device based on distance information stored in a distance table.

9. The server device of claim 6, wherein when the distance between the client device and the printing device is smaller than a predetermined distance, the means for setting further comprises:
   means for prompting a user of the client device to select whether to set the print mode corresponding to the print job to the locked print mode; and
   means for setting the print mode corresponding to the print job based on the selection by the user.

10. The server device of claim 6, wherein
the locked print mode instructs the printing device to print the print job in response to receiving corresponding authentication information.

11. A system for setting a print mode of a printing device, comprising:
a client device configured to send, to a server device, a request to print a print job at the printing device;
the server device including
means for receiving, from the client device, the request to print the print job at the printing device,
means for determining a distance between the client device and the printing device,
means for setting a print mode corresponding to the print job to one of a locked print mode or an unlocked print mode based on the determined distance between the client device and the printing device, and
means for sending the print job and the corresponding print mode setting to the printing device;
the printing device configured to print the print job in accordance with the corresponding print mode setting;
a plurality of wireless access points configured to transmit a plurality of beacons, wherein
the client device includes a first signal power detecting part configured to detect signal power levels of the plurality of beacons received by the client device,
the printing device includes a second signal power detecting part configured to detect signal power levels of the plurality of beacons received by the printing device, and
the means for determining includes means for automatically determining the distance between the client device and the printing device based on the detected signal power levels of the plurality of beacons detected by each of the client device and the printing device.

12. The system of claim 11, wherein the means for setting comprises:
when the distance between the client device and the printing device is smaller than a predetermined distance, means for setting the print mode corresponding to the print job to the locked print mode; and
when the distance between the client device and the printing device is smaller than the predetermined distance, means for setting the print mode corresponding to the print job to the unlocked print mode.

13. The system of claim 11, wherein the means for determining comprises:
means for determining the distance between the client device and the printing device based on distance information stored in a distance table.

14. The system of claim 11, wherein when the distance between the client device and the printing device is smaller than a predetermined distance, the means for setting further comprises:
means for prompting a user of the client device to select whether to set the print mode corresponding to the print job to the locked print mode; and
means for setting the print mode corresponding to the print job based on the selection by the user.

15. The system of claim 11, wherein
the locked print mode instructs the printing device to print the print job in response to receiving corresponding authentication information.

16. A non-transitory computer-readable storage medium having embedded therein instructions, which when executed by a processor, cause the processor to perform a method for setting a print mode of a printing device, the method comprising:
receiving, from a client device, a request to print a print job at the printing device;
automatically determining a distance between the client device and the printing device based on signal power levels of a plurality of beacons detected by each of the client device and the printing device, the beacons being transmitted by a plurality of wireless access points;
setting a print mode corresponding to the print job to one of a locked print mode or an unlocked print mode based on the determined distance between the client device and the printing device; and
sending the print job and the corresponding print mode setting to the printing device.

17. The non-transitory computer-readable storage medium of claim 16, wherein
the locked print mode instructs the printing device to print the print job in response to receiving corresponding authentication information.

* * * * *